April 28, 1964　　　K. A. MERZ　　　3,130,480
METHOD OF MAKING CENTRIFUGAL BLOWER WHEEL
Filed Dec. 31, 1958　　　　　　　　　　　　2 Sheets-Sheet 1

INVENTOR
KENNETH A. MERZ
BY Teller & McCormick
ATTORNEYS

April 28, 1964 K. A. MERZ 3,130,480
METHOD OF MAKING CENTRIFUGAL BLOWER WHEEL
Filed Dec. 31, 1958 2 Sheets-Sheet 2
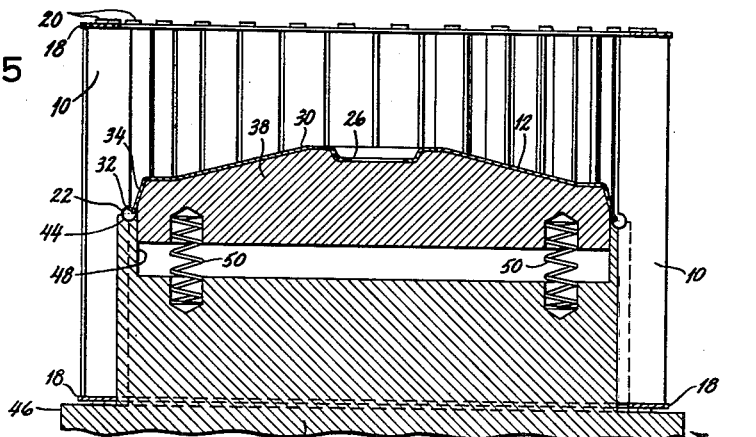
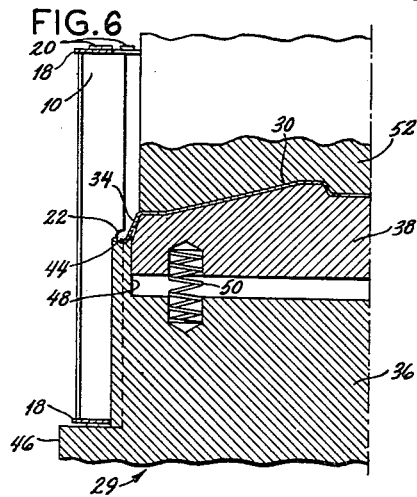
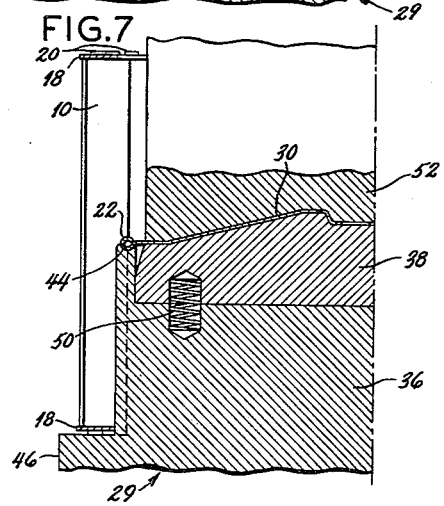
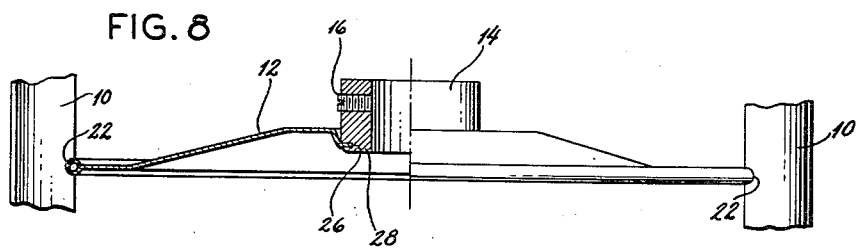
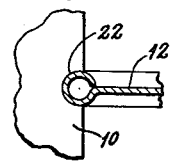
INVENTOR
KENNETH A. MERZ
BY Teller & McCormick
ATTORNEYS

United States Patent Office 3,130,480
Patented Apr. 28, 1964

3,130,480
METHOD OF MAKING CENTRIFUGAL
BLOWER WHEEL
Kenneth A. Merz, Cornwall, Conn., assignor to The
Torrington Manufacturing Company, Torrington,
Conn., a corporation of Connecticut
Filed Dec. 31, 1958, Ser. No. 784,266
2 Claims. (Cl. 29—156.8)

This invention relates to a centrifugal blower wheel of the type wherein there is an annular series of longitudinal air moving blades connected with each other at their ends and wherein there is a generally radial supporting disc which engages the blades between the ends thereof to connect them with a central hub or hub means.

One object of the invention is to provide an improved connection between the radial supporting disc and the annular series of interconnected blades for holding the blades in fixed relationship with the said supporting disc.

Another object of the invention is to provide a method for assembling the above-mentioned connection between the blades and the supporting disc after the blades have been connected with each other at their ends.

Still another object of the invention is to provide a forming tool particularly adapted for use in assembling the connection between the blades and the supporting disc in accordance with the above-mentioned method.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 5 is a view similar to FIG. 4 but showing the blade assembly in position around the radial supporting disc and the lower portion of the forming tool for assembly of said disc with the blade assembly, the sectional portion of this view being taken along the line 5—5 of FIG. 3.

FIG. 6 is a fragmentary view similar to FIG. 5 but showing the radial supporting disc engaged by both upper and lower portions of the forming tool at an intermediate stage of assembly with the blade assembly.

FIG. 7 is a fragmentary view similar to FIG. 6 but showing the radial supporting disc in its final stage of assembly with the blade assembly.

FIG. 8 is a combined side elevational and sectional view of a central portion of an assembled blower wheel embodying the invention.

FIG. 9 is an enlarged view showing the connection of the radial supporting disc with the blades in greater detail.

Figure 1:
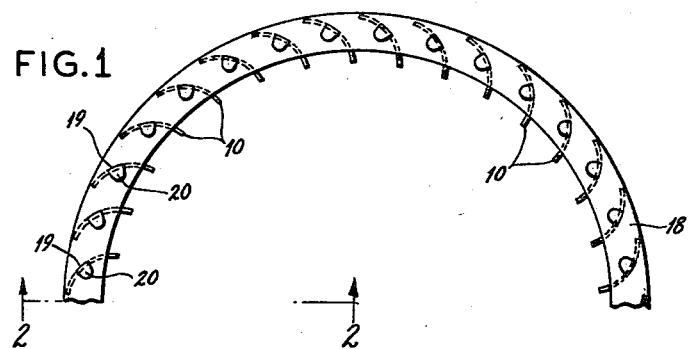
FIG. 1 is a fragmentary end view of the blade assembly of a blower wheel which embodies the invention.
Figure 2:
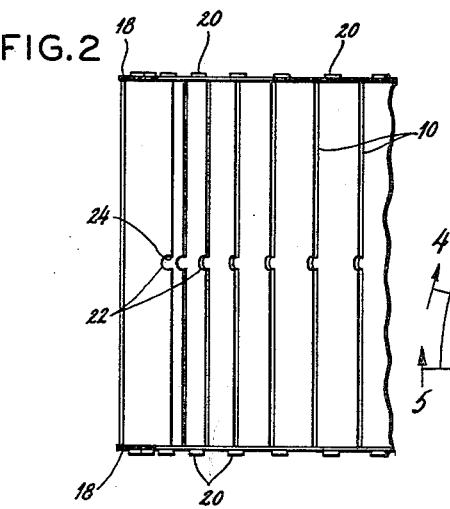
FIG. 2 is a fragmentary central sectional view of the blade assembly of FIG. 1.
Figure 3:
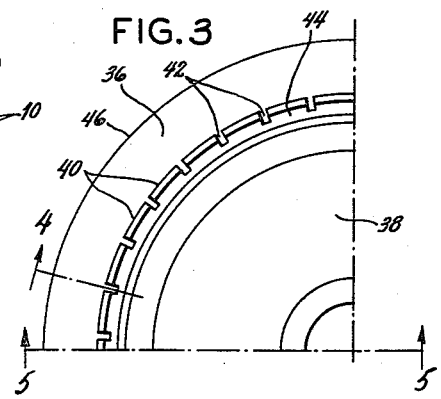
FIG. 3 is a fragmentary top view of a lower portion of a forming tool adapted for use in assembling a radial supporting disc with the blade assembly of FIGS. 1 and 2.

Referring to the drawings and more particularly to FIGS. 1, 2, 8 and 9 thereof, it will be observed that the blower wheel as illustrated includes a blade assembly comprising an annular series of parallel equally spaced longitudinal air moving blades 10, 10 which are structurally separate but which are connected with each other at their ends. As best illustrated FIGS. 8 and 9, each of the blades 10, 10 is individually connected between its ends to the peripheral portion of a generally radial supporting structure which is shown as comprising a sheet metal disc 12. The supporting disc 12 has its inner portion rigidly connected to a hub means which is rotatable about a central longitudinal axis, said hub means being shown as comprising a separate unitary hub 14 which is provided with a set screw 16 for connection with a rotatable shaft.

The air moving blades 10, 10 may have any usual or preferred cross-sectional shape, the shape of the blades not forming any part of the invention. Similarly, the manner in which the blades 10, 10 are connected with each other at their ends forms no part of the present invention and the blades may be so connected by any usual or preferred connecting means. As shown, the blades 10, 10 are connected with each other at their ends by two similar end rings 18, 18 each having an annular series of slots 19, 19 therein. Tabs 20, 20 formed at the ends of the blades 10, 10 project through the end ring slots 19, 19 and are bent back against the outer sides of the rings so as to firmly hold the blades and rings in fixed relationship.

In accordance with the invention, each of the blades 10, 10 is formed with a notch 22 near its center and the several notches 22, 22 are arranged in an annular series and open inwardly when the blades 10, 10 are assembled in an annular series and connected by means of the end rings 18, 18. Each of the notches 22, 22 extends outwardly from the inner edge of its blade and preferably has sides that diverage in the direction away from said blade edge. As shown, the notches 22, 22 in the blades 10, 10 are partially circular in shape and each of the notches has an arcuate edge 24 which is substantially in excess of 180° in length, the sides of said notches therefore diverging in the direction away from the blade inner edges.

The supporting disc 12 is shown in its assembled form (FIG. 8) as having a partly conically shaped inner portion and as being formed in one-piece of sheet metal. The disc, however, is not necessarily so formed and the shape of its inner portion may vary widely within the scope of the invention. Similarly, the manner in which a central hub means is provided for the disc may vary widely, a hub formed integrally with the disc being but one obvious alternative to the construction shown. In the construction shown a rigid connection between the supporting disc 12 and the afore-mentioned separate hub 14 is effected by providing a suitable central opening 26 in the disc, entering a reduced diameter end portion 28 of the hub in said opening and forming said hub end portion firmly about the edge portion of the disc adjacent said opening as by peening.

As is also illustrated in FIG. 8 and in FIG. 9 in greater detail, the supporting disc 12 in its assembled form has a peripheral portion with a partially circular cross-sectional shape entered in the notches 22, 22 in the blades 10, 10. The said disc peripheral portion, in accordance with the invention, has pressure engagement with the edge of each blade notch and thus individually locks the blades in fixed relationship with the disc whereby to collectively connect the blades of the blade assembly with the disc.

In making a blower wheel embodying the present invention in accordance with the method of the invention, a supporting disc is provided in blank form and has a circular edge portion with a diameter slightly less than the diameter between the inner edges of the blades in a blade assembly and also has an annular portion of smaller diameter which projects generally longitudinally from the plane of the circular edge. The disc blank is positioned with its said circular edge portion in register with the notches in the blades of a blade assembly and pressure is applied longitudinally to the blank so as to at least partially flatten the projecting annular portion thereof and to thereby increase the diameter of said circular edge portion and enter the same in the blade notches. Movement of the circular edge portion of the disc into the blade notches is obstructed so that said edge portion is curled to a partially circular cross-sectional shape and firmly engages the edges of said notches whereby to lock the blades in fixed relationship to the disc.

Figure 4:
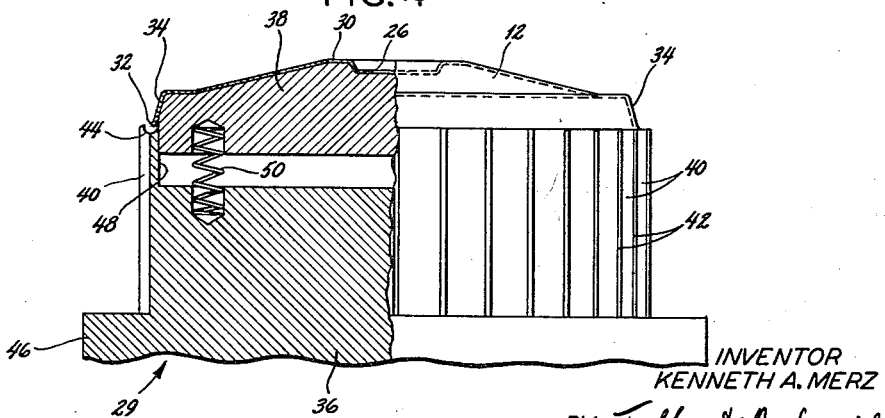
FIG. 4 is a combined elevational and sectional view of the lower portion of the forming tool and of the supporting disc in blank form, the sectional portion of the view being taken along the line 4—4 of FIG. 3.

There is shown in FIG. 4 a preferred form of a disc blank 30. The blank 30 has a circular edge portion 32 with a diameter slightly less than the diameter between the inner edges of the blades in a blade assembly. An annular flange 34 on the disc blank 30 constitutes an annular portion of smaller diameter than said circular edge portion 32 and said flange projects generally longitudinally from the plane of its circular edge.

While the method of the invention may obviously be carried out in various ways, the use of a forming tool, such as that indicated at 29 in FIGS. 4 through 7, is preferred. As shown, the forming tool 29 includes a lower portion which comprises a stationary lower part or base 36 and a movable upper part 38. The lower part or base 36 of the lower portion of the forming tool is generally cylindrical in shape and is preferably positioned in an upright attitude as shown. A plurality of radial projections 40, 40 formed thereon define an annular series of longitudinally extending peripheral grooves 42, 42 into which the blades of a blade assembly may be longitudinally inserted. A partially round annular forming groove 44 formed at the upper end of the projections 40, 40 and lying in a horizontal plane communicates outwardly of its inner edge with the upper end of each of the vertical grooves 42, 42. Thus there is provided an annular series of partially round forming surfaces on the upper portions of the projections 40, 40 between the several grooves 42, 42. A radially extending flange 46 formed at a lower portion of the stationary form part 36 constitutes means for supporting a blade assembly with the blades thereof entered in the grooves 42, 42 and with the blade notches approximately in vertical register with the annular forming groove 44. A blade assembly is shown so supported on the flange 46 in FIG. 5.

The movable upper part 38 of the lower portion of the forming tool 29 constitutes means for holding a supporting disc blank within a blade assembly with the circular edge portion 32 of the disc disposed above and outwardly of the inner edge of the annular forming groove 44 and in register with the blade notches and with the flange or projecting annular portion 34 of the disc extending upwardly from said circular edge portion. As shown, said upper part 38 of the lower portion of the forming tool is generally cylindrical in shape and is slidably received in a suitable bore 48 formed in the upper end portion of the stationary part 36. Cushioning means such as a plurality of springs 50, one of which is shown in FIG. 4, bias the movable part 38 upwardly in the bore 48. The upper surface of the movable part 38 of the forming tool is shaped to conform with the inner portion of a disc blank when the blank is placed on said part with its flange or projecting annular portion 34 extending downwardly.

It will be apparent that when a disc blank 30 is supported on the movable forming tool part 38 and a blade assembly is supported on the flange 46, pressure may be readily applied longitudinally to the disc blank on the side opposite its flange by an upper portion of the forming tool comprising a pressure pad 52 shown in FIGS. 6 and 7. When pressure is so applied, the movable part 38 of the forming tool 29 is urged downwardly against the bias of the springs 50, 50 and the free end of circular edge portion of the disc flange is urged downwardly into engagement with the inner portion of the wall of the annular forming groove 44. With the continued application of pressure on the disc blank by the upper tool portion or pad 52, said flange free end or circular edge portion 32 is advanced outwardly along the wall of the forming groove and is curled to a partially circular cross-sectional shape within the blade notches 22, 22 and engages the edges of said notches as illustrated in FIG. 7.

When the blower wheel is removed from the forming tool 29, the curled peripheral portion of the disc tends to spring back to its original shape. The said portion is, however, prevented from returning to its original shape by the edges 24, 24 of the blade notches 22, 22 and thus exerts a substantial pressure against the said notch edges. This results in a rigid and secure connection between the supporting disc and the individual blades and in consequence the said blades are collectively rigidly connected to and locked in fixed relationship with the disc as shown in FIGS. 8 and 9.

The invention claimed is:

1. A method for making a centrifugal blower wheel comprising the steps of providing a plurality of similar air moving blades each formed with a notch extending into the blade from one blade edge, each of said notches being partially circular with an arcuate edge which is substantially in excess of 180° in length, assembling said blades in longitudinal positions and in an annular series about a longitudinal axis with their notches forming an annular series and opening inwardly, providing a sheet metal supporting disc having a generally radial inner portion and an integral outer portion in the form of an annular flage which projects generally axially from said inner portion in one direction with its free edge of circular form and of a diameter slightly less than the diameter between the inner edges of the assembled blades, positioning said disc with its said free edge in register with the notches in the annularly assembled blades, and axially pressing said disc to effect relative axial movement between said blades and said disc inner portion and to cause said free edge on said flange to move generally radially outwardly into the blade notches, said pressing step including the step of obstructing the outward movement of said flange edge in interblade regions and in such manner that an annular portion of the flange adjacent said edge is curled to a partially circular cross-sectional shape complementary to the edge-to-edge dimensions of said notches and is inherently stressed during curling so as to be in pressure engagement with the edges of said blade notches whereby to lock the blades in fixed relationship to the disc upon release of said axial pressure.

2. A method for making a centrifugal blower wheel comprising the steps of providing a plurality of similar air moving blades each formed with a notch extending into the blade from one blade edge, each of said notches having a mouth portion which is narrower than an inner portion thereof, assembling said blades in longitudinal positions and in an annular series about a longitudinal axis with their notches forming an annular series and opening inwardly, providing a sheet metal supporting disc having a generally radial inner portion and an integral outer portion in the form of an anular flange which projects generally axially from said inner portion in one direction with its free edge of circular form and of a diameter slightly less than the diameter betewen the inner edges of the assembled blades, positioning said disc with its said free edge in register with the notches in the annularly assembled blades, and axially pressing said disc to effect relative axial movement between said blades and said disc inner portion and to cause said free edge on said flang to move generally radially outwardly into the blade notches, said pressing step including the step of obstructing the outward movement of said flange edge in interblade regions and in such manner that an annular portion of the flange adjacent said edge is curled to a partially circular cross-sectional shape complementary to the edge-to-edge dimensions of said notches and is inherently stressed during curling so as to be in pressure engagement with the edges of said blade notches inwardly of their said mouth portions whereby to lock the blades in fixed relationship to the disc upon release of said axial pressure.

References Cited in the file of this patent

UNITED STATES PATENTS

| | | |
|---|---|---|
| 1,092,464 | Watson et al. | Apr. 7, 1914 |
| 2,125,697 | Swingle et al. | Aug. 2, 1938 |
| 2,126,053 | Sprigings | Aug. 9, 1938 |
| 2,181,592 | Sullivan | Nov. 28, 1939 |
| 2,345,285 | Pennington | Mar. 28, 1944 |
| 2,453,504 | Fleischer | Nov. 9, 1948 |
| 2,496,179 | Schwarz | Jan. 31, 1950 |
| 2,537,805 | Wilken | Jan. 9, 1951 |
| 2,651,830 | Wilken et al. | Sept. 15, 1953 |
| 2,745,171 | King et al. | May 15, 1956 |
| 2,852,182 | Wilken | Sept. 16, 1958 |
| 2,857,665 | Cohen | Oct. 28, 1958 |
| 2,982,468 | Mayne | May 2, 1961 |
| 3,004,326 | Merz | Oct. 17, 1961 |
| 3,021,591 | Mayne et al. | Feb. 20, 1962 |